United States Patent Office 3,290,246
Patented Dec. 6, 1966

3,290,246
LUBRICANTS CONTAINING ZINC
DITHIOPHOSPHATES
Emilio Perrotti, San Donato Milanese, and Sergio Del Ross, Milan, Italy, assignors to SNAM S.p.A., Milan, Italy, a company of Italy
No Drawing. Filed Sept. 4, 1963, Ser. No. 306,630
Claims priority, application Italy, Sept. 7, 1962, Patent 692,797
10 Claims. (Cl. 252—32.7)

This invention relates to a lubricant composition having improved antioxidant, antiwear and antirust properties.

It is known that zinc dialkyl-dithiophosphates are used as additives for lubricant oils, since these compounds have, in addition to a marked antioxidant activity, some "antiwear" features and good anticorrosion properties.

It is also known that amine compounds are commonly employed as antioxidant additives, but they often have the disadvantage of imparting brown coloration and of causing deposits in lubricant oils which are thus degraded.

We have now found and prepared compounds having high antioxidant activity, and having the general formula:

$$\begin{array}{c} RO \\ \diagdown \\ R'O \end{array} \begin{array}{c} S \\ \| \\ P-S-Zn-S \end{array} \begin{array}{c} S \\ \| \\ P \end{array} \begin{array}{c} OR \\ \diagup \\ OR' \end{array} \quad (I)$$

wherein the R'O group is an alcohol radical capable of making the final product soluble in mineral oils and RO is an amino alcohol radical, an amino phenol radical or a heterocyclic nitrogen-containing alcohol radical.

Thus according to this invention there is provided a lubricant composition comprising a mineral oil and a compound having the general Formula I above.

The compound of Formula I is preferably present in an amount up to 1.5% by weight.

Since the radicals OR and OR' are responsible for the antioxidant activity of the final product, we have prepared numerous compounds having the aforesaid general formula wherein R'O represents a group having the formula $C_nH_{2n+1}O_1-$, more particularly $C_{16}H_{33}O-$, whilst RO— can be represented in the cases of primary or secondary alcohols by the following formulae:

```
CH2Y              X
|                 |
CH-CH3            CHY
|                 |
CH2O-H            CHO-H
                  |
                  CH3
  (II)            (III)
``` respectively, wherein X represents a hydrogen atom or a hydrocarbon radical, e.g. —CH₃, and Y represents a nitrogen-containing radical in which the nitrogen is present as amine nitrogen or as a heteroatom, e.g.

⟨N—CH₂,   ⟩—NCH₃,   ⟩—NH, HN—⟨

As examples of amino alcohols may be mentioned the following compounds derived from Formulae II and III:

```
C6H5          CH2-N⟨        C6H5
|             |             |
NH            CH-CH3        N-CH3
|             |             |
CH2           CHOH          CH2
|             |             |
CHCH3         CH3           CHOH
|                           |
CH2OH                       CH3
```

```
C6H5          C6H5          C6H5                    NH-⟨⟩
|             |             |                       |
N-CH3         NH            NH                      CHCH3
|             |             |                       |
CHCH3         CHCH3         CH2                     CHOH
|             |             |                       |
CHOH          CHOH          CHOH                    CH3
|             |             |
CH3           CH3           CH3
```

We have also carried out some investigations with compounds wherein RO represents:

```
CH3
|
CH-CH3
|
CH2
|
CH-OH
|
CH3
``` in order to provide a comparison with commercial alkyl-dithiophosphates.

We have discovered that the more active zinc alkyldithiophosphates are those derived from secondary alcohols, whilst those derived from primary and tertiary alcohols show substantially no activity.

Examples of amino phenols are:

4-dodecyl-2-piperidinomethylphenol and
4-tert.butyl-2-piperidinomethylphenol

In order to best illustrate the invention, we shall now describe the preparation of preferred alcohols used in the production of the compounds used in the composition of this invention, and also the preparation of such compounds.

(A) PREPARATION OF AMINO PHENOLS AND AMINO ALCOHOLS

*4 - dodecyl-2-piperidinomethylphenol.*—The p.dodecylphenol is obtained with quantitative yields by alkylating phenol with commercial tetrapropylene; it is a viscous yellow liquid having a B.P. of 150° C. under 0.3 mm. Hg. From this, by treatment with piperidine and formaldehyde, the 4-dodecyl-2-piperidinomethylphenol is obtained, which is a viscous liquid boiling at 170°–190° under 0.2 mm. Hg. The yield is 80%.

*Analysis.*—Calculated for $C_{24}H_{41}NO$: C=80.18%, H=11.50%, N=3.89%. Found: C=80.74%, H=11.16%, N=3.90%.

*3-methyl-butanol.*—This compound was prepared by treating methylmagnesium iodide in anhydrous ether with isobutyraldehyde, according to the known art. Colourless liquid having B.P. 110°–111° C.

*4-methyl-2-pentanol.*—As in the above lower homologous compound, this was obtained by treating acetaldehyde in anhydrous ether with isobutylmagnesium bromide. Colourless liquid having B.P. 130°–133° C.

*2-methyl-3-anilinopropanol.*—This compound was obtained by reacting aniline with methallyl alcohol in the presence of powdered sodium hydroxide using the known process employed for producing allyl alcohol. 0.2 mol of alcohol and 0.1 mol of aniline are heated at boiling temperature for 24 hours in the presence of 0.1 g. of fused and powdered sodium hydroxide. A yellow liquid having B.P. 99°–100° C. under 0.1 mm. Hg.

*Analysis.*—Calculated for $C_{10}H_{15}NO$: C=72.69%, H=9.15%, N=8.48%. Found: C=72.46%, H=8.83%, N=8.64%.

The conversion of the final product is in the order of 20%. By operating under pressure at a higher temperature, it is possible to obtain the amino alcohol with greater conversions and yields.

*1-(N-methylanilino)-isopropanol.*—This compound was obtained by reacting methylaniline with propylene oxide in the following way: 11 g. propylene oxide, 22 g. methylaniline and 0.05 g. KOH in 20 cc. methyl alcohol are mildly boiled for 2 hours; thereafter, to this solution 10 cc. water are added and the boiling is continued for a further 2 hours. This solution is poured in abundant water, and the product is extracted. By fractional distillation 15.5 g. of the compound are obtained. A viscous, yellow oil having a pleasant smell and B.P. 110°–111° C. under 2 mm. Hg.

*Analysis.*—Calculated for $C_{10}H_{15}NO$: C=72.68%, H=9.15%, N=8.48%. Found: C=72.53%, H=9.03%, N=8.70%.

*3-(N-methylanilino)-2-butanol.*—This compound was prepared in a manner similar to the preceding compound, by reacting methylaniline with 2,3-epoxy-butane. 18 g. 2,3-epoxy-butane, 27 g. methylaniline and 30 cc. methyl alcohol are boiled for 24 hours. The solution is poured into water, and the extracted oil is fractionally distilled. 10 g. of an oily, yellow product, boiling at 95° C. under 0.2 mm. Hg are obtained.

*Analysis.* — Calculated for $C_{11}H_{17}NO$: C=73.70%, H=9.46%, N=7.84%. Found: C=73.25%, H=8.96%, N=8.04%.

*3-anilino-2-butanol.* — This compound was prepared in a manner similar to the preceding compound, by reacting aniline with 2,3-epoxy-butane. 18 g. aniline, 7.2 g. butylene oxide and 0.2 g. potassium hydroxide in 20 cc. methyl alcohol are boiled for 24 hours. This solution is poured into water and the extracted oil is fractionally distilled. 12 g. of an oily, yellow compound, boiling at 102°–105° C. under 0.2 mm. Hg, are collected.

*Analysis.* — Calculated for $C_{10}H_{15}NO$: C=72.70%, H=9.16%, N=8.49%. Found: C=72.35%, H=9.03%, N=8.81%.

*1-anilino isopropanol.*—This compound was prepared in a manner similar to the preceding compounds, by reacting aniline with propylene oxide, under pressure, at a temperature from 115° to 130° C.

The results of the tests are tabulated in the Table I, from which it is seen that the best operative conditions correspond to those of test 6. The reaction by-product is probably a compound of the formula:

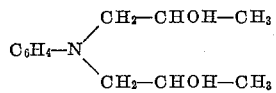

which results from the reaction of 1-anilino isopropanol with propylene oxide.

The 1-anilino isopropanol is a viscous, yellow oil having aromatic smell, very soluble in organic solvents, boiling at 105° C. under 0.2 mm. Hg.

*Analysis.* — Calculated for $C_9H_{13}NO$: C=71.50%, H=8.68%, N=9.27%. Found: C=71.93%, H=8.91%, N=9.40%.

*3-cyclohexylamino-2-butanol.* — This compound was obtained by reacting cyclohexylamine with 3-chloro-2-butanol in the following way: 5.4 g. 3-chloro-2-butanol and 10 g. cyclohexylamine are mixed; this mixture, which is exothermic, is kept at the room temperature for 30 minutes and thereafter is kept at 100° C. for 1 hour. White crystals of the hydrochlorate are separated. The reaction mass is made alkaline and the compound is extracted and then distilled under reduced pressure. 5.7 g. of a product boiling at 122°–125° C. under 10 mm. Hg. are obtained. The product is an oily, colourless liquid.

*Analysis.* — Calculated for $C_{10}H_{21}NO$: C=70.10%, H=12.36%, N=8.17%. Found: C=69.90%, H=11.98%, N=7.80%.

(B) PREPARATION OF ZINC AMINO-ARYL- AND AMINO-ALKYL DITHIOPHOSPHATES

These compounds, which will individually be described hereinafter, are very viscous liquids, insoluble in water and soluble in non-polar organic solvents. This enables easy purification from mineral impurities.

These compounds are prepared by reacting alcohols or phenols with phosphorus pentasulphide in the molar ratio 4:1, according to the following equation:

$$4ROH + P_2S_5 = 2(RO)_2PSSH + H_2S$$

wherein R is an alkyl or aryl group. The alkyl- or aryldithiophosphonic acids so obtained are neutralized using sodium hydroxide; from the sodium salts zinc salts are obtained by interaction.

0.2 mol of cetyl alcohol and 0.2 mol of the ROH compound under test, dissolved in 100 cc. anhydrous benzene are added to a suspension of 0.1 mol $P_2S_5$ (washed, using $CS_2$) in 100 cc. anhydrous benzene. The mixture is kept boiling until the solid disappears: a portion of the solvent is distilled off, and the filtered solution is neutralized, under stirring, using 10% sodium hydroxide solution in the presence of phenolphthalein. To the suspension of sodium salt the equivalent of zinc chloride solution is added, under vigorous stirring, adding, if necessary, further solvent, and finally the organic phase is separated, dried and concentrated under reduced pressure.

*Zinc cetyl-(4-tert.butyl-2-piperidinomethylphenyl)-dithiophosphate.* — Viscous oil, slightly soluble in gasoline, very soluble in benzene, slightly soluble in mineral oils.

*Analysis.* — Calculated for $C_{64}H_{114}N_2O_4S_4P_2Zn$: C=62.44%, H=9.33%, N=2.28%, S=10.41%. Found: C=62.61%, H=9.53%, N=2.41%, S=11.13%.

*Zinc cetyl-(4-dodecyl-2-piperidinomethylphenyl)-dithiophosphate.* — Viscous, grey liquid, very soluble in non-polar solvents, slightly soluble in ethyl alcohol.

*Analysis.* — Calculated for $C_{80}H_{154}N_2O_4S_4P_2Zn$: C=66.2%, H=10.67%, N=1.93%, S=4.41%. Found: C=65.81%, H=10.12%, N=2.32%, S=4.91%.

*Zinc cetyl-(isobutyl)-dithiophosphate.* — Waxy, yellow solid melting at 42°–44° C., very soluble in all the non-polar solvents and in mineral oils.

*Analysis.* — Calculated for $C_{40}H_{84}O_4S_4P_2Zn$: C=54.30%, H=9.57%, S=14.50%. Found: C=54.90%, H=10.00%, S=13.98%.

*Table I*

| Number test | Mols of aniline | Mols of propylene oxide | Recovery of aniline (mols) | Catalyst | Yield of product, percent | Reaction Temp., ° C. | Reaction time | Residual, g. | Maximum pressure, atm. |
|---|---|---|---|---|---|---|---|---|---|
| 1 | 2 | 1 | N.D. | Conc. HCl, 2 drops | 60 | 100 | 4ʰ | N.D. | P.O. |
| 2 | 2 | 1 | 1.05 | 5 cc. methyl alcohol | 82 | 125 | 2ʰ | N.D. | 3.5 |
| 3 | 2 | 1 | 1.01 | ___do___ | 81 | 125 | 2ʰ | N.D. | 3.5 |
| 4 | 2 | 1 | 1.03 | ___do___ | 82 | 125–130 | 3ʰ | N.D. | 3.5 |
| 5 | 3 | 1 | 2.04 | ___do___ | 82 | 100 | 3ʰ30′ | N.D. | 1.6 |
| 6 | 3 | 1 | 2.03 | 10 cc. methyl alcohol | 85 | 115 | 3ʰ | 5 | 1.7 |
| 7 | 2 | 1 | 1.05 | ___do___ | 82 | 115 | 3ʰ | 8 | 3.4 |
| 8 | 1 | 1 | 0.2 | ___do___ | 60 | 115 | 5ʰ | 17 | 4.0 |

*Zinc (2 - methyl-3-anilinopropyl)-dithiophosphate.* — Viscous, orange oil, very soluble in the non-polar solvents and in oils.

*Analysis.* — Calculated for $C_{52}H_{94}O_4N_2S_4P_2Zn$: C=58.53%, H=8.90%, N=2.63%, S=12.05%. Found: C=60.07%, H=9.37%, N=2.66%, S=11.78%.

*Zinc cetyl-(2-butyl)-dithiophosphate.*—Waxy, white, or slightly yellow, solid melting at 40°–45° C., very soluble in non-polar organic solvents. Soluble in mineral oils.

*Analysis.*—Calcd. for $C_{42}H_{88}O_4S_4P_2Zn$: C=55.20%, H=9.72%, S=14.05%. Found: C=55.10%, H=10.00%, S=13.57%.

*Zinc cetyl - (4 - methyl - 2 - pentyl)-dithiophosphate.*—Waxy, white, or slightly yellow coloured, solid melting at 36°–42° C., very soluble in organic solvents and mineral oils.

*Analysis.*—Calcd. for $C_{44}H_{92}O_4S_4P_2Zn$: C=56.14%, H=9.86%, S=13.64%. Found: C=56.35%, H=9.70%, S=13.30%.

*Zinc bis-(4-methyl-2-pentyl)-dithiophosphate.* — Waxy solid very soluble in non-polar organic solvents and very soluble in mineral oils. It was prepared by reacting 4-methyl-2-pentanol with phosphorus pentasulphide, in the molar ratio 4:1.

*Zinc cetyl - (4 - piperidine - 3-methyl-2-butyl)-dithiophosphate.*—Viscous and turbid liquid, fairly soluble in organic solvents and slightly soluble in mineral oils.

*Analysis.*—Calcd. for $C_{52}H_{106}N_2O_4S_4P_2Zn$: C=57.88%, H=9.90%, N=2.60%, S=11.88%. Found: C=58.40%, H=10.12%, N=2.35%, S=11.12%.

*Zinc cetyl - [3 - (N - methylanilino)-2-propyl]-dithiophosphate.*—Viscous, yellow, slightly turbid liquid, soluble in non-polar organic solvents and fairly soluble in mineral oils.

*Analysis.*—Calcd. for $C_{52}H_{94}N_2O_4S_4P_2Zn$: C=53.53%, H=8.90%, N=2.63%, S=12.05%. Found: C=58.40%, H=9.02%, N=2.87%, S=12.83%.

*Zinc cetyl - (3-anilino-2-butyl)-dithiophosphate.* — Viscous, yellow, slightly turbid liquid very soluble in non-polar organic solvents, and fairly soluble in mineral oils.

*Analysis.*—Calcd. for $C_{52}H_{96}N_2O_4S_4P_2Zn$: C=58.53%, H=8.90%, N=2.63%, S=12.05%. Found: C=59.01%, H=9.05%, N=2.48%, S=11.70%.

*Zinc cetyl-(3-anilino-2-propyl)-dithiophosphate.* — This product was prepared in the following way: In a 2 litre flask, 74 g. of depurated $P_2S_5$ and 350 cc. of dry benzene are introduced; this mixture is heated to boiling, and a solution of 161.3 g. cetyl alcohol and 101 g. 3-aniline-2-propanol in 300 cc. of dry benzene is added for 10 minutes. This mixture is kept boiling for 30 minutes, and during this time the pentasulphite is almost totally reacted. The hydrogen sulphite is removed by partial vaporisation under reduced pressure. The filtered solution is diluted with benzene (2 litres) and neutralised with 1 N aqueous sodium hydroxide. Under vigorous stirring, 590 cc. of the solution are obtained, corresponding to 88% of the theoretical (665 cc.). The sodium salt separates as a gelatinous mass.

The zinc salt is prepared by adding, under vigorous stirring, a 2 N solution of zinc chloride in a 10% excess over the employed sodium hydroxide. The solution is stirred for 15 minutes, and then the organic phase separates, which, after drying on sodium sulphate, is rapidly concentrated under reduced pressure, to avoid prolonged heating.

The dithiophosphate (329 g.: yield 94 to 95%) is a viscous, greenish yellow oil. It is very soluble in benzene and gasoline, and sufficiently soluble in mineral oils also if they have a high degree of viscosity.

*Analysis.*—Calcd. for $C_{50}H_{90}N_2O_4S_4P_2Zn$: C=57.80%, H=8.73%, N=2.69%, S=12.34%, Zn=6.30%. Found: C=58.16%, H=9.04%, N=2.88%, S=12.54%, Zn=6.00%.

*Zinc cetyl - (3 - cyclohexylamino - 2 - butyl)-dithiophosphate.*—Viscous oil, soluble in non-polar solvents, not very soluble in mineral oils.

*Analysis.*—Calcd. for $C_{44}H_{106}N_2O_4S_4P_2Zn$: C=57.88%, H=9.90%, N=2.60%, S=11.88%. Found: C=58.50%, H=10.11%, N=2.40%, S=11.83%.

(C) BEHAVIOUR OF ADDITIVES UNDER OXIDATION, ANTIWEAR AND ANTIRUST TESTS.

(a) *Oxidations tests.*—In Table II there are tabulated the results obtained from a series of tests which indicate the anti-oxidising properties of the products prepared according to this invention. The oxidation test was carried out according to the prescription of ASTM/D943 (NOM/M62); the Staeger test was carried out according to the standards of "Comitato Elettrotecnico Italiano," consisting of heating the oil at 110° C. in the presence of a copper catalyst. When the test is completed, the alterations in the neutralisation number and the amount of eventually formed deposit are recorded; alternatively, the number of hours required to attain an increase of 0.25 in the neutralisation number is recorded. The compounds listed in the table were tested in oil formulations containing 0.06% of the compound under test, in the presence of 0.2% of a phenol (2,6-tert.butyl-p-cresol), 1.5% of a commercial rust-proofing product and 0.005% of a commercial demulsifying agent.

*Table II*

| Compound under test | Naturalisation number KOH, mg./g. | Demulsivity in secs. | Time of ASTM-D-943 NOM/M62 test (hrs.) | Time of oxidation Staeger test (hrs.) |
|---|---|---|---|---|
| Zinc cetyl-isobutyl-dithiophosphate | 0.21 | 290 | 840 | |
| Zinc cetyl-(3-anilino-2-methyl-1-propyl)-dithiophosphate | 0.15 | 250 | 1,848 | 432 |
| Zinc cetyl-(2-butyl)-dithiophosphate | | | 1,176 | |
| Zinc bis-(4-methyl-2-pentyl)-dithiophosphate | 0.19 | 244 | 1,344 | 792 |
| Zinc cetyl-(4-piperidino-3-methyl-2-butyl)-dithiophosphate | 0.16 | 303 | 1,680 | 576 |
| Zinc cetyl-[3-(N-methylanilino)-2-propyl] dithiophosphate | 0.21 | 237 | 2,184 | 576 |
| Zinc cetyl-(3-anilino-2-butyl)-dithiophosphate | 0.21 | 220 | 3,024 | 576 |
| Zinc cetyl-(3-anilino-2-propyl)-dithiophosphate | 0.21 | 215 | 3,300 | 864 |
| Zinc cetyl-(3-cyclohexylamino-2-butyl)-dithiophosphate | 0.13 | 237 | 2,352 | 503 |

From the results tabulated in Table II it is clear that the presence of both a secondary alcohol group and an amino group in the molecule, designated as RO in the general Formula I, give the compounds used in the present invention an astonishing activity, and that, amongst the amino groups, the arylamino groups are the most active.

Finally, remarkable results can be obtained when the amino alcohol used in the preparation of the compound has both a secondary alcohol group and a secondary aromatic amine group. In fact, both zinc cetyl-(3-analino-2-butyl)-dithiophosphate and zinc cetyl-(3-anilino-2-propyl)-dithiophosphate, and particularly the latter, have an activity which is about three times that shown by zinc cetyl-(2-butyl)-dithiophosphate. Similar conclusions are obtained by comparison of the activities of the zinc cetyl-(3-cyclohexylamino-2-butyl)-dithiophosphate.

In Table III the results of comparison tests amongst several formulations are recorded.

The tests were carried out for 60 seconds using the 4 ball "Wear Tester" machine modified to operate up to 200 kg. (1200 pounds). For this test there were used Atlas Balls grade 1 EP of ½″ produced by SKF Industries Inc., Atlas Balls Division, of Philadelphia, U.S.A.

*Table III*

OXIDATION TEST

| Formulation Number | Demulsivity ASTM/D 157-36 (secs.) | Time of the ASTM/D 943 (NOM/M62) | Time of the Staeger test, hours | Deposit of the first period of the Staeger test, g./l. | Deposit of the 2d period of the Staeger test, g./l. | Demulsivity after 2,000 hours ASTM/D 943 NOM/M62 test, secs. | Additives |
|---|---|---|---|---|---|---|---|
| 1 | 274 | 2,184 | 864 | Absent | 1.285 | 200 | Commerc. |
| 2 | 230 | 2,184 | 1,008 | ----do---- | 0.60 | 350 | Do. |
| 3 | 312 | 2,184 | 864 | ----do---- | 1.177 | | Do. |
| 4 | 270 | 2,016 | 1,300 | ----do---- | 0.442 | 230 | Do |
| 5 | 215 | 3,000 | 864 | ----do---- | 0.132 | 155 | Zinc cetyl-(3-aniline-2-propyl)-dithiophosphate. |

Compositions of the formulations of Table III.

Formulation 1:
  0.2% phenol-(2,6-di-tert.butyl-p-cresol) (a)
  0.05% commercial dithiophosphate (b)
  0.03% commercial amine antioxidant (c)
  0.2% commercial rustproofing agent (d)
  0.005% commercial demulsifier (e)
Formulation 2:
  0.2% (a)
  0.06% (b)
  0.015% (c)
  0.2% (d)
  0.05% (e)
Formulation 3:
  0.2% (a)
  0.05% (b)
  0.05% commercial aminophenol antioxidant (f)
  0.015% (c)
  0.2% (d)
  0.005% (e)
Formulation 4:
  0.2% (a)
  0.05% (b)
  0.05% (f)
  0.015% (c)
  0.2% (d)
  0.005% (e)
Formulation 5:
  0.2% (a)
  0.06% zinc cetyl-(3-anilino-2-propyl)-dithiophosphate
  0.2% (d)
  0.005% (c)

(b) *Antiwear test.*—The results obtained from tests relating to the antiwear characteristics of an oil with an additive prepared according to the present invention (zinc cetyl-(3-anilino-2-propyl)-dithiophosphate) are recorded in Table IV in comparison with the results relating to the same oil with only a commercial additive added thereto.

In Table IV, A represents the oil with zinc cetyl-(3-anilino-2-propyl)-dithiophosphate as an additive, while B, C, D, E, F and G represents the same oil with 6 different commercial compounds, all based on dithiophosphates, as additives.

*Table IV*

ANTIWEAR TEST

| Additive | Percent type concentration of base oil | Maximum load in absence of drying up seizure | Spec. pressure at maximal load in absence of drying up seizure, kg./cm.² |
|---|---|---|---|
| Base oil: | | | |
| 1 | V.E./50°=2.95 | 55 | 18.330 |
| 2 | V.E./50°=10.15 | 75 | 20.140 |
| 3 | V.E./50°=23.9 | 90 | 24.170 |
| A | 0.4 V.E./50°=2.95 | 120 | 27.080 |
|   | V.E./50°=10.15 | 130 | 29.340 |
|   | V.E./50°=23.9 | 130 | 29.340 |
| B | 0.4 V.E./50°=2.95 | 100 | 25.680 |
|   | V.E./50°=10.15 | 110 | 27.030 |
|   | V.E./50°=23.9 | 125 | 28.210 |
| C | 0.4 V.E./50°=2.95 | 110 | 25.890 |
|   | V.E./50°=10.15 | 110 | 28.250 |
|   | V.E./50°=23.9 | 110 | 26.170 |
| D | 0.4 V.E./50°=2.95 | 110 | 25.890 |
|   | V.E./50°=10.15 | 110 | 27.030 |
|   | V.E./50°=23.9 | 105 | 26.370 |
| E | 0.4 V.E./50°=2.95 | 100 | 25.680 |
|   | V.E./50°=10.15 | 115 | 27.660 |
|   | V.E./50°=23.9 | 125 | 27.630 |
| F | 0.4 V.E./50°=2.95 | 120 | 27.080 |
|   | V.E./50°=10.15 | 130 | 29.340 |
|   | V.E./50°=23.9 | 120 | 27.080 |
| G | 0.4 V.E./50°=2.95 | 110 | 26.450 |
|   | V.E./50°=10.15 | 110 | 27.630 |
|   | V.E./50°=23.9 | 120 | 27.080 |

(c) *Antirust tests.*—The results relating to tests on the antirust features of oils to which the additives listed in Table IV were added, are recorded in Table V.

The tests were carried out according to ASTM/D 665–54 standards.

*Table V*

ANTITRUST FEATURES—ASTM/D-665-54 TEST

| Additive name | Conc., percent | Base oil | Degree of rusting |
|---|---|---|---|
| A (°) | 0.4 | V.E./50°=2.95 | Absence. |
| B | 0.4 | V.E./50°=2.95 | Traces. |
| C | 0.4 | V.E./50°=2.95 | Middle. |
| D | 0.4 | V.E./50°=2.95 | Absence. |
| E | 0.4 | V.E./50°=2.95 | Strong. |
| F | 0.4 | V.E./50°=2.95 | Slight. |
| G | 0.4 | V.E./50°=2.95 | Strong. |

(°) A = zinc cetyl-(3-anilino-2-propyl)-dithiophosphate.

We claim:
1. A lubricant composition comprising a major amount of a mineral oil and a minor amount, sufficient to improve the antioxidant, antiwear and antirust properties of the oil, of a compound having the general formula:

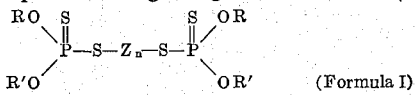 (Formula I)

where R'O is a secondary alcohol radical, and RO is selected from the group consisting of amino phenols having the structural formula HO—$R_1$—Z, where $R_1$ is selected from the group consisting of phenylene and alkylphenylene, and Z is piperidinomethyl, and of primary and secondary alcohols having the formulae:

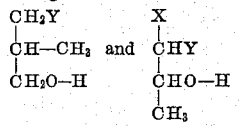

where X is selected from the group consisting of hydrogen and lower alkyls and Y is a nitrogen-containing radical in which the nitrogen is present as amine nitrogen or as a heteroatom, and is selected from the group consisting of

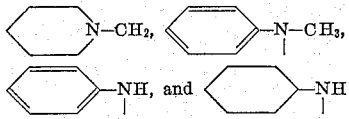

2. A composition according to claim 1, in which the RO radical is selected from the group consisting of

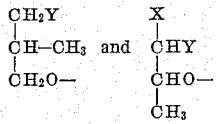

wherein X represents a hydrogen atom or hydrocarbon radical selected from the group consisting of methyl, ethyl, propyl and Y is a nitrogen containing radical selected from the group consisting of

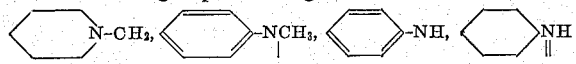

3. A composition according to claim 1 in which the R'O radical has the formula $C_nH_{2n+1}O$—, and $n$ is between 4 and 20.
4. A composition according to claim 3 in which the R'O radical has the formula $C_{16}H_{33}O$—.
5. A composition according to claim 1 in which the R radical is 3-anilino-2-propyl.
6. A composition according to claim 5 in which the compound of Formula I is zinc cetyl-(3-anilino-2-propyl)-dithiophosphate.
7. A composition according to claim 1 in which the compound of Formula I is zinc cetyl-(3-anilino-2-butyl)-dithiophosphate.
8. A composition according to claim 1, in which the compound of Formula I is present in an amount up to 1.5%.
9. A composition according to claim 1 in which the RO radical is selected from the group consisting of 4-dodecyl-2 - piperidinomethyl phenoxy, 2 - methyl-3-anilino-1-propoxy, 1 - (N - methyl anilino) - isopropoxy, 3 - (N-methyl anilino) - 2 - butoxy, 3-anilino-2-butoxy, 1-anilino isopropoxy, and 3-cyclohexylamino-2-butoxy.
10. A composition according to claim 1 in which the compound of Formula I is selected from the group consisting of zinc cetyl - (4 - tert.butyl - 2 - piperidine-methylphenyl)-dithiophosphate, zinc cetyl-(4-dodecyl-2-piperidine-methylphenyl)dithiophosphate, zinc cetyl-(3-aniline-2-methyl-1-propyl)-dithiophosphate, zinc cetyl-(4-piperidine - 3 - methyl - 2-butyl)-dithiophosphate, zinc cetyl-(N-methyl-3-aniline-2-propyl)-dithiophosphate, zinc cetyl-(3-aniline-2-butyl)-dithiophosphate, zinc cetyl-(3-aniline-2-propyl)-dithiophosphate, and zinc cetyl-(3-cyclohexylamino-2-butyl)-dithiophosphate.

References Cited by the Examiner
UNITED STATES PATENTS

| | | | |
|---|---|---|---|
| 2,973,323 | 2/1961 | Millikan et al. | 252—32.7 |
| 2,977,382 | 3/1961 | Millikan | 252—32.7 X |
| 3,002,014 | 9/1961 | Dinsmore et al. | 252—32.7 X |

DANIEL E. WYMAN, *Primary Examiner.*

P. P. GARVIN, *Assistant Examiner.*